W. G. CARTTER AND E. D. ARTHUR.
SOLAR HEAT COLLECTING APPARATUS.
APPLICATION FILED APR. 21, 1919.

1,425,174.

Patented Aug. 8, 1922.
2 SHEETS—SHEET 1.

Witness:
W. M. Gentle

Inventors.
William G. Cartter and
Edward D. Arthur.
James R. Townsend
his atty

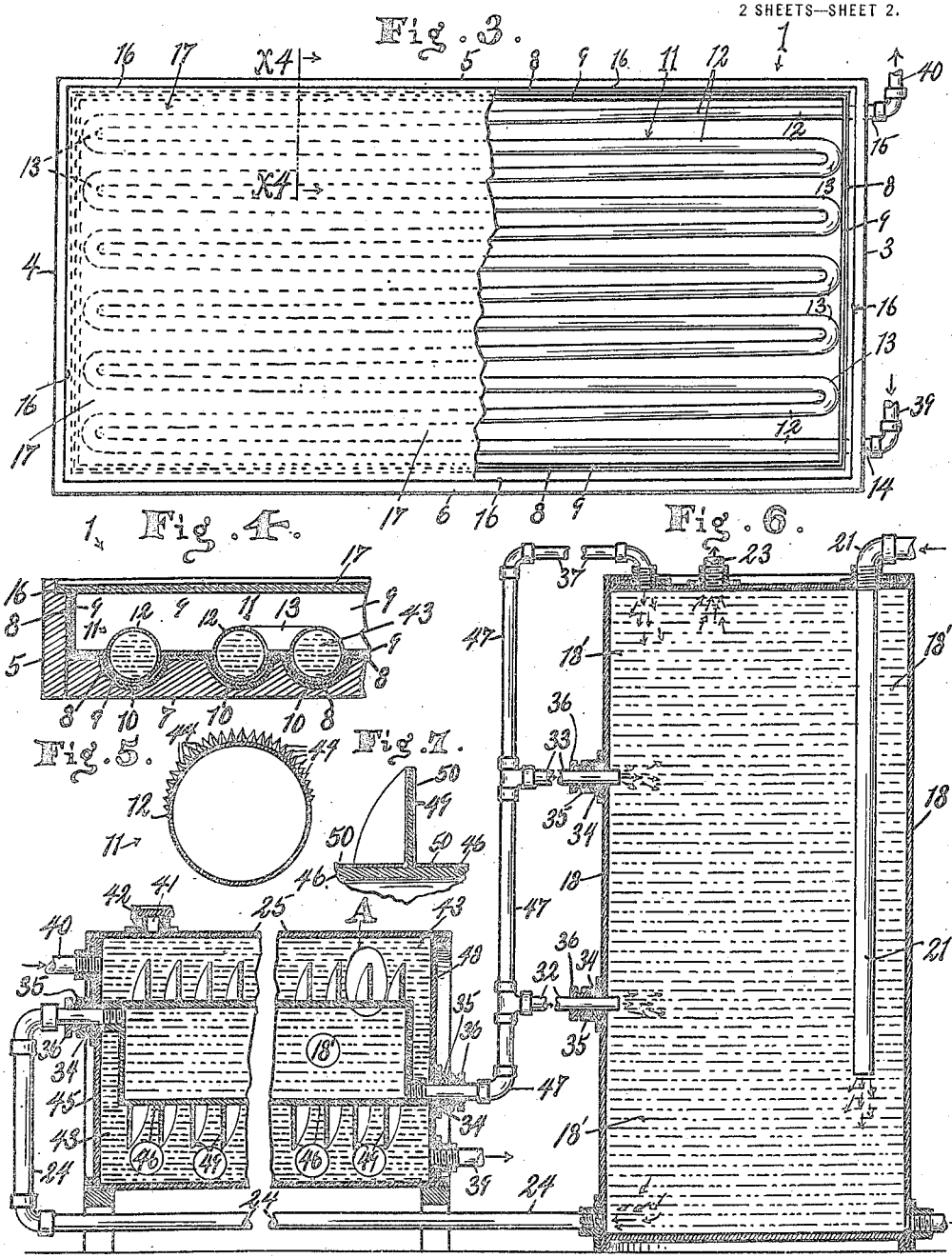

UNITED STATES PATENT OFFICE.

WILLIAM G. CARTTER AND EDWARD D. ARTHUR, OF ARCADIA, CALIFORNIA.

SOLAR-HEAT-COLLECTING APPARATUS.

1,425,174.   Specification of Letters Patent.   Patented Aug. 8, 1922.

Application filed April 21, 1919. Serial No. 291,762.

*To all whom it may concern:*

Be it known that we, WILLIAM G. CARTTER and EDWARD D. ARTHUR, citizens of the United States, residing at Arcadia, in the county of Los Angeles and State of California, have invented a new and useful Solar-Heat-Collecting Apparatus, of which the following is a specification.

This invention relates to an apparatus for collecting and using solar heat, and it may be said to consist of the new and useful features and in the improved construction, combination and arrangement of parts the purposes of which will be apparent to those skilled in the art from a consideration of the preferred form of construction herein shown.

One of the principal objects of this invention is to provide an apparatus that will be proof against injury by low temperatures; for as is well known solar heat collectors necessarily have a part thereof in the open where it is exposed to changing temperatures which latter, when below the freezing point, is liable to injure the apparatus.

Another object of the invention is to provide an apparatus that will be more efficient in collecting the solar heat and for storing and conserving said heat when collected.

Another object of the invention is to provide an apparatus in which a heat storage tank of large size will be interposed between the heat collector and the heat utilizing means; the purpose of which will be hereafter explained.

Another object of the invention is to provide a means for evenly distributing through the water tank the heated water that has passed through the heat storage tank which distribution is accomplished by providing a plurality of discharge pipes for the heated water at different heights in said water tank.

Other objects and advantages of this invention will be apparent from a consideration of the preferred form of construction herein shown described and claimed.

The drawings illustrate the invention.

Fig. 3 is a plan elevation of heat collector removed from the house roof; a part of the glass covering broken away; showing the coil pipe associated therewith.

Fig. 4 is a section taken on the line $x^4-x^4$ of Fig. 3 the parts being enlarged and showing in detail the construction of the heat collector.

Fig. 5 is a section through one pipe of the heating coil showing a modified form of heat collector.

Fig. 6 is a modified form of what is shown in Fig. 2.

Fig. 7 is an enlarged view of a portion of the interior tank enclosed in the ellipse A in Fig. 6.

Figure 1:
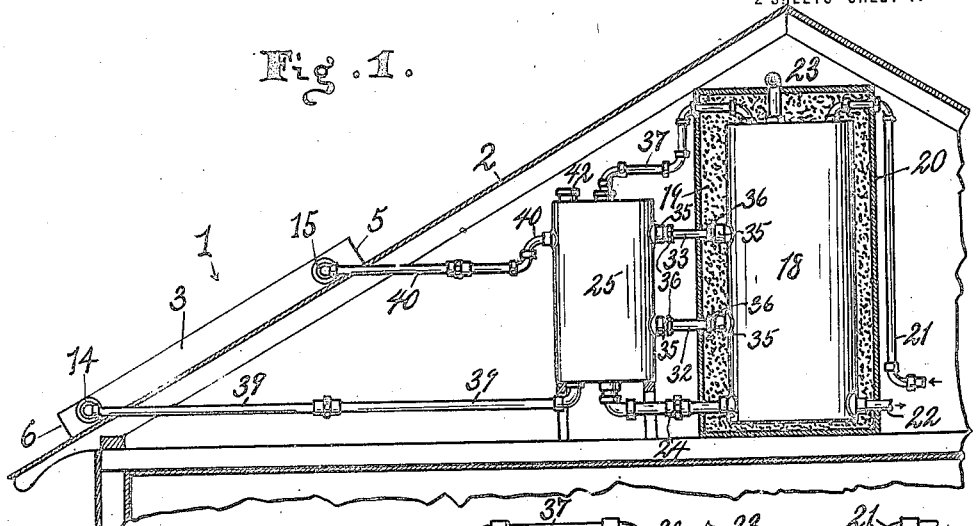
Figure 1 is a side elevation of the apparatus installed in a house; part of the latter being shown in section and parts broken away.

In detail the heat collector 1 is secured to the roof of a house 2 by any known means; and in a position that will expose the top surface of the heat collector to the sun's rays; and this exposure is preferably such that at the noon hour the rays of the sun will contact with said surface in a line perpendicular thereto.

The frame of the heat collector 1 consists of the ends 3 and 4, and the sides 5 and 6 respectively which are secured to the bottom 7 by any well known means; forming thereby an open top box in which the heat collecting apparatus is secured.

The interior surface of the box is first lined with a non-heat conducting material such as asbestos 8 and over this material 8 is laid a bed of copper 9 which latter is one of the best heat conductors known; and the purposes of these linings will be hereafter explained.

As seen in Fig. 4 the bottom 7 is provided with the channel 10 which in cross section is the contour of a circle, and into which channel is fitted the linings 8 and 9 thus forming a bed for and in which the coil of pipe 11 is partly embedded.

The coil of pipe 11 is formed of the lengths 12 and turned ends 13 which are integral and which form a continuous passageway from the inlet to the outlet ends 14 and 15 respectively; and the lengths 12 are positioned so that from the inlet to the outlet ends of the coil there is an upward inclination, and this upward inclination is for the purpose of reducing the resistance to the flow of the fluid in said coil.

The upper inner edges of the ends 3 and 4 and the sides 5 and 6 are recessed to form the seat 16 for the glass covering 17 which latter can be secured in place by any well known means.

Within the building 2 and preferably in the attic thereof is a water tank 18 which is enclosed in the non-heat conducting material 19 within the casing 20.

Through a pipe 21 the water 18' is supplied to the tank 18 from a source not shown; and through the pipes 22 and 23 cold and hot water respectively are supplied to the water distributing system of the house 2; which distributing system and also the lower part of the house are broken away.

Figure 2:
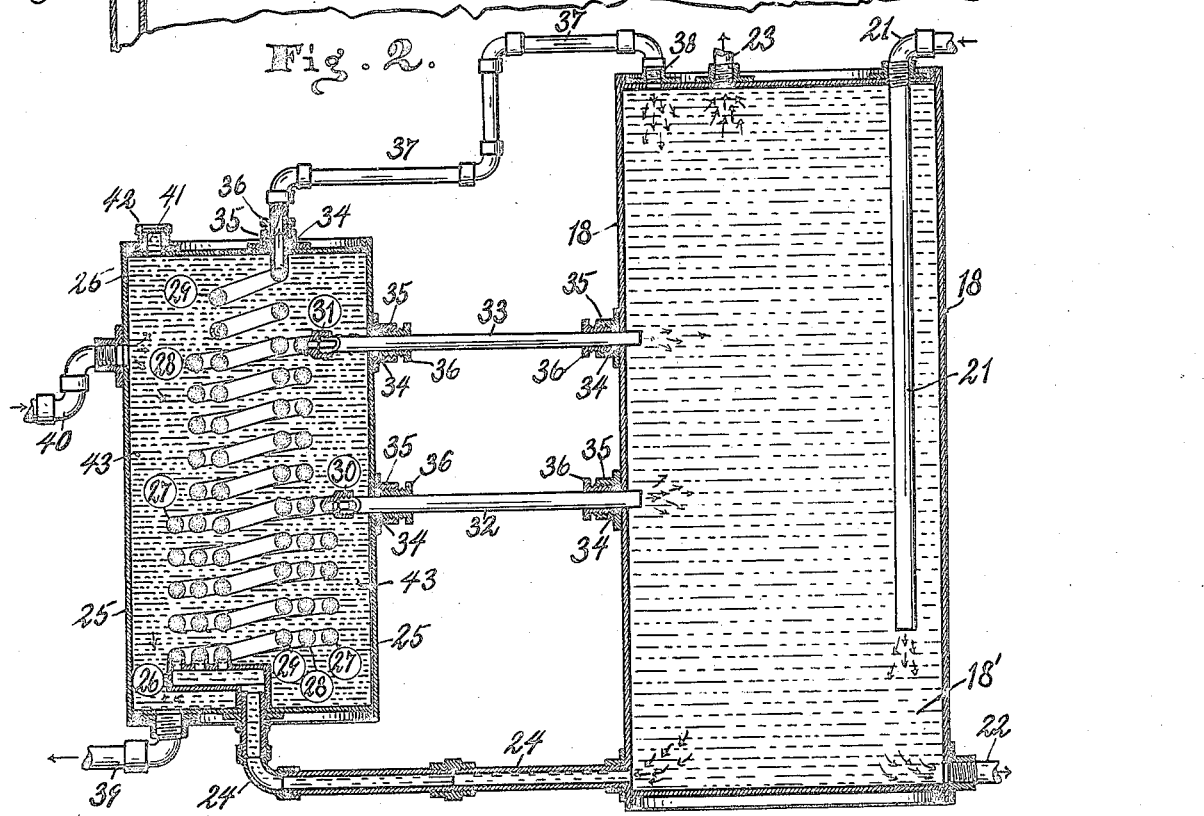
Fig. 2 is a central vertical section through the tanks associated with the apparatus.

To the bottom of the tank 18 there is connected one end of the pipe 24 the other end of which is threaded through the bottom of the heat storage tank 25 and has the end thereof secured to the distributer head 26 (see Fig. 2).

Within the storage tank 25 there are three coiled pipes 27, 28 and 29 respectively each of which has one end connected to the distributor head 26; and these coils extend upward in the tank 25 to different heights.

The coils 27 and 28 have threaded sockets 30 and 31 respectively into which the respective pipes 32 and 33 are fitted and these pipes extend through the casing of the tank 25 and also through the casing of the tank 18.

To prevent leakage from the tanks 18 and 25 the pipes 32 and 33 are encased at the point of egress through said tanks with the packing rings 34 which latter are seated in the sockets 35 and held in place by the screw plugs 36.

The upper end of the coil pipe 29 passes upward in the tank 25; and has the end thereof extending through the end of said tank; and to prevent leakage the pipe 29 is provided with a packing similar to that encasing the pipes 32 and 33.

The end of the pipe 29 is secured to one end of a pipe line 37 which has its other end screwed into the socket 38 on the top of the tank 18.

From the foregoing it can readily be seen that the water in the tank 18 is free to pass through the pipe 24, distributor head 26 and coils 27, 28 and 29 and discharge back into the tank 18 through the pipes 32, 33 and 37 when the temperature of the water in this circulatory system is unbalanced by heat.

As heretofore indicated the change of temperature is accomplished by the solar heat collector; and the solar heat is transmitted to the water by the following means.

Secured to the bottom of the tank 25 is one end of the pipe 39 which extends outward through the roof of the house 2 and has its other end connected to the inlet end 14 of the coil pipe 11.

To the outlet end 15 of the coil pipe 11 is secured one end of the pipe 40 which latter extends inwardly through the roof of the house 2 and has its other end attached near the upper end of the tank 25.

The tank 25 has on the top end thereof the inlet 41 that is closed by the cap screw 42; and through the inlet 41 the tank 25 is kept filled with a non-freezing fluid 43; which of course fills the coil 11 and its pipe connections to said tank.

When the heat rays of the sun contact with the coil 11 the heat thereof is transmitted to the fluid 43; which transmission of heat induces a circulation of said fluid; the colder fluid passing from the bottom of the tank 25 through the pipe 39 to displace the warmer fluid in the coil 11 which passes upward through the coil as it is heated and back to the tank 25 through the pipe 40; and through this circulation the heat from the sun is transferred from the collector 1 to the storage tank 25.

It will also be apparent that as the heat is transferred from the collector 1 to the storage 25 that the stored heat will be transferred to the coil pipes 27, 28 and 29 and transferred to the water therein which transition of heat causes a circulation of the water in the tank 18 and its pipe connections to the aforementioned coils; consequently the water in the tank 18 will acquire practically the same temperature as the temperature of the non-freezing liquid 43 in the tank 25 and the temperature of the liquid in the latter tank will be the same as that in the collector 1 before the circulations in these systems is stopped by a balancing of temperatures.

In order to more efficiently collect the heat rays in the coil 11 either by radiation or conduction the sides and bottom of the collector 1 are lined with a non-heat conducting material 8 preferably asbestos so that the heat rays will be deflected by said lining; and by conduction through the copper lining 9 transmitted to the coil 11.

Also as seen in Figs. 6 and 7 a modified form for transferring the heat from the storage tank 25 to the water supply is shown. In this modification the tank 25 has its end in a vertical position and its center portion is broken away.

The pipe 24 has one end connected to the tank 18 and the other end thereof passes through the end 45 of the tank 25 and is secured in one end of the cylinder 46 and near the top edge thereof; and to prevent leakage the pipe 24 where it passes through the end 45 is provided with a packing similar to that heretofore described.

To the other end of the cylinder 46 at the bottom edge thereof is secured one end of the pipe 47 which latter extends through the end 48 of the tank 25 and is packed in like manner to pipe 24 to prevent leakage.

The pipe 47 is turned upward and to it are connected one end of the pipes 32, 33 and 37; so that the water in the tank 18 can pass through the pipe 24, cylinder 46, pipe 47 and the branch pipes 32, 33 and 37 back into the tank 18.

The pipe connections from the tank 25 to the heat collector 1 are practically the same as in the other form.

In order to produce a greater heat conduction area the cylinder 46 it provided with a helical ribbon 49 which latter and also the exterior surface of the cylinder can be encased in a copper jacket 50 as seen in Fig. 7.

In operation the heat rays from the sun either by radiation or conduction are transmitted to the coil 11; and from this coil are transferred to the non-freezing liquid therein; thereby unbalancing the temperature thereof as heretofore stated and causing a circulation of said fluid by which means the heat is carried to the storage tank 25.

The heat accumulated in storage tank 25 is transferred to the water in tank 18 by circulation of water through coil pipes 27, 28 and 29.

It is thus seen that the coiled pipes in the storage tank are heated by the heat collector and that as the temperature rises a circulation of water to and from the water tank is produced and the temperature of all the water is raised eventually to the approximate temperature of the non-freezing fluid in said storage tank.

From the foregoing it can readily be seen that after the water in the tank 18 has been raised to a temperature sufficient for domestic use, that a large accumulation of heat is stored in the tank 25; which heat will be transferred to the water entering the tank 18 as the heated water thereof is drawn off; thereby greatly increasing the bulk of heated water without altering the size of the water tank and this feature of the invention is an improvement in the art.

The invention admits of modifications and a right is reserved to all such changes and modifications as do not depart from the scope and spirit of the preferred form of structure herein shown.

Having thus described our invention, what we claim as new and desire to secure by Letters Patent is.

1. In a solar heater, a heat collector having a coiled pipe therein that is exposed to the rays of the sun, a heat storage tank, pipe connections between said tank and said coiled pipe, a water tank, a pipe having one end connected to said water tank and the other end of said pipe having a distributer head connected thereto and being inside said heat storage tank, and a plurality of pipes connected to said distributer head and connected to said water tank at different heights.

2. A solar heater comprising a box having a bottom and adapted to be exposed to the sun; a heat conducting bed in said box and insulated from the bottom thereof; a heat collector comprising coiled pipe laid in said heat conducting bed; a heat storage tank; a pipe connection between said heat collector and said storage tank; a water tank, and means whereby the heat collected by said heat collector is utilized to heat the water in said water tank.

3. A solar heater comprising a box having a bottom and adapted to be exposed to the sun, a copper bed in said box; an asbestos lining between said box and copper bed to prevent heat collected by said bed from escaping through the sides and bottom of the box; a heat collector comprising lengths of parallel pipes with alternate ends connected to form a continuous passage having inlet and outlet ends; a heat storage tank; pipes connecting the inlet and outlet ends of said heat collector with said storage tank; a non-freezing fluid heat conveying medium filling said storage tank, and pipes connected to and through said heat collector; a water tank; a pipe connecting the bottom of said water tank with a distributor head in said storage tank; coiled pipes having their lower ends attached to and extending upward in said storage tank from said head to different heights; and pipe connections from the top ends of said coiled pipes back to said water tank.

4. In a solar heater, a heat collector, a storage tank, pipe connections between said heat collector and said storage tank, a water tank, and means for transmitting water from said water tank through said storage tank and back to the water tank at different heights relative thereto.

5. In a solar heater, a heat collector; a storage tank; pipe connections between said storage tank and heat collector; a non-freezing fluid heat conveying medium in said storage tank that is adapted to circulate to said heat collector through one of said pipes and return to said storage tank through the other pipe; a distributor head in said storage tank; coiled pipes rising to different heights in said storage tank, and having their lower ends connected to said head; a water tank; a discharge pipe connecting the bottom of said water tank with said distributor head, and return pipes connecting the upper ends of said coiled pipes with said water tank.

6. In a solar heater, a heat collector comprising a coiled pipe adapted to be exposed to the rays of the sun; a heat conducting bed under the coiled pipe of said heat collector and in which the coiled pipe is partly embedded; a non-heat conducting lining under said bed; a heat storage tank; means for transferring the heat from said heat collector to said heat storage tank; a distributor head in said storage tank; coiled pipes rising to different heights in said storage tank, and having their lower ends connected to said head; a water tank; a discharge pipe connecting the bottom of said water tank to said head; a return pipe connecting the highest coiled pipe with the top of said water tank; and other return pipes connecting the other coiled pipes with said water tank at different heights.

7. A solar heater comprising a copper jacketed coiled pipe adapted to be exposed to the rays of the sun, and having an inlet and an outlet end; a copper bed on which said pipe is positioned and in which it is partly embedded; a heat storage tank; pipes connecting the inlet and outlet ends of said coiled pipe with said storage tank; a non-freezing fluid heat conducting medium filling said heat storage tank and adapted to circulate through said pipes and the coiled pipe connected thereto; a distributor head in the bottom of said heat storage tank; coiled water pipes having their lower ends connected to said distributor head; a water tank; a discharge pipe connecting the bottom of said water tank with said distributor head; water return pipes connecting the upper ends of said coiled water pipes with said water tank, and arranged to enter said water tank at different elevations.

8. In a solar heater, a heat collector consisting of a coiled pipe exposed to rays of the sun, a heat storage tank, means for transferring the heat from said heat collector to said storage tank, a plurality of coiled pipes having their lower ends connected to a water inlet in the bottom of said storage tank, said pipes rising to different heights in said storage tank, a water tank, and pipe connections between said water tank and the upper ends of said coiled pipes.

In testimony whereof, we have hereunto set our hands at Los Angeles California, this 10th day of April, 1919.

WILLIAM G. CARTTER.
EDWARD D. ARTHUR.

Witness:
WM. M. GENTLE.